(12) United States Patent
Park et al.

(10) Patent No.: US 12,707,064 B2
(45) Date of Patent: Aug. 11, 2026

(54) VIDEO ENCODING/DECODING METHOD AND APPARATUS APPLYING A MERGE MODE WITH MOTION VECTOR DIFFERENCE TO COMBINED AN INTER/INTRA PREDICTION MODE OR A GEOMETRIC PARTITIONING MODE

(71) Applicants: HYUNDAI MOTOR COMPANY, Seoul (KR); KIA CORPORATION, Seoul (KR)

(72) Inventors: Seung Wook Park, Yongin-si (KR); Jin Heo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 54 days.

(21) Appl. No.: 18/622,277

(22) Filed: Mar. 29, 2024

(65) Prior Publication Data

US 2024/0244231 A1 Jul. 18, 2024

Related U.S. Application Data

(63) Continuation of application No. PCT/KR2022/014806, filed on Sep. 30, 2022.

(30) Foreign Application Priority Data

Oct. 1, 2021 (KR) ........................ 10-2021-0131037
Sep. 29, 2022 (KR) ........................ 10-2022-0124104

(51) Int. Cl.
*H04N 19/159* (2014.01)
*H04N 19/139* (2014.01)
*H04N 19/176* (2014.01)

(52) U.S. Cl.
CPC ......... *H04N 19/159* (2014.11); *H04N 19/139* (2014.11); *H04N 19/176* (2014.11)

(58) Field of Classification Search
USPC .................................................... 375/240.13
See application file for complete search history.

(56) References Cited

U.S. PATENT DOCUMENTS 11,533,498 B2 12/2022 Chen
2018/0316937 A1 11/2018 Zhang et al.
(Continued)

FOREIGN PATENT DOCUMENTS

KR 20200054111 A 5/2020
KR 20210034534 A 3/2021
(Continued)

OTHER PUBLICATIONS

S. Jeong et al., "Merge Mode With Motion Vector Difference," 2020 IEEE International Conference on Image Processing (ICIP), Abu Dhabi, United Arab Emirates, 2020, pp. 1157-1160 (Year: 2020).*
(Continued)

*Primary Examiner* — Justin W Rider
(74) *Attorney, Agent, or Firm* — Lempia Summerfield Katz LLC

(57) ABSTRACT

A method and an apparatus for encoding/decoding a video are provided. A method for decoding a video according to the present disclosure includes determining whether to apply a combined inter/intra prediction (CIIP) mode or a geometric partitioning mode. The method for decoding the video also includes deriving a motion vector from a merge candidate list. The method for decoding the video also includes correcting the motion vector by using motion vector difference information. The method for decoding the video also includes generating a prediction block of a current block based on a corrected motion vector.

12 Claims, 27 Drawing Sheets

(56) References Cited

U.S. PATENT DOCUMENTS

| | | | | |
|---|---|---|---|---|
| 2020/0374528 | A1* | 11/2020 | Huang | H04N 19/176 |
| 2021/0051335 | A1* | 2/2021 | Liao | H04N 19/503 |
| 2021/0160520 | A1 | 5/2021 | Chen | |
| 2021/0235075 | A1 | 7/2021 | Lee | |
| 2021/0409750 | A1 | 12/2021 | Xiu et al. | |
| 2022/0070441 | A1 | 3/2022 | Xiu | |
| 2022/0329822 | A1* | 10/2022 | Chang | H04N 19/46 |
| 2022/0385888 | A1 | 12/2022 | Lee | |
| 2023/0015638 | A1 | 1/2023 | Lee | |
| 2023/0068035 | A1 | 3/2023 | Chen | |
| 2023/0412793 | A1* | 12/2023 | Zhang | H04N 19/61 |

FOREIGN PATENT DOCUMENTS

| | | | |
|---|---|---|---|
| KR | 20210065051 | A | 6/2021 |
| KR | 20210103571 | A | 8/2021 |
| KR | 20210118070 | A | 9/2021 |
| WO | 2020136365 | A1 | 7/2020 |

OTHER PUBLICATIONS

International Search Report and Written Opinion cited in corresponding international patent application No. PCT/KR2022/014806; Jan. 18, 2023; 10 pp.
Office action cited in Indian application No. 202417033442; Mar. 25, 2026; 7 pp.

* cited by examiner

| Encoding Or Not Of Intra-prediction Mode | | Weight (w) |
|---|---|---|
| Upper Neighbor Block (A) | Left Neighbor Block (L) | |
| O | O | 3 |
| O | X | 2 |
| X | O | 2 |
| X | X | 1 |

*FIG. 8*

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

*FIG. 11*

| Index | Horizontal | Vertical |
|---|---|---|
| 0 | +1 | 0 |
| 1 | −1 | 0 |
| 2 | 0 | +1 |
| 3 | 0 | −1 |

*FIG. 12*

| Index | 0 | 1 | 2 | 3 | 4 | 5 | 6 | 7 |
|---|---|---|---|---|---|---|---|---|
| Motion Distance (Luma Pixel Distance) | 1/4 | 1/2 | 1 | 2 | 4 | 8 | 16 | 32 |

*FIG. 13*

| Index | Horizontal | Vertical |
|---|---|---|
| 0 | +1 | 0 |
| 1 | −1 | 0 |
| 2 | 0 | +1 |
| 3 | 0 | −1 |
| 4 | +1 | +1 |
| 5 | −1 | +1 |
| 6 | −1 | −1 |
| 7 | +1 | −1 |

*FIG. 15*

| | |
|---|---|
| } else { | |
| if( sps_ciip_enabled_flag && sps_gpm_enabled_flag && sh_slice_type == B &&00 cu_skip_flag[ x0 ][ y0 ] == 0 && cbWidth >= 8 && cbHeight >= 8 && cbWidth < ( 8 * cbHeight ) && cbHeight < ( 8 * cbWidth ) && cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( ciip_flag[ x0 ][ y0 ] && ciip_mmvd_enabled_flag ) | |
| ciip_mmvd_merge_flag[ x0 ][ y0 ] | ae(v) |
| if( ciip_mmvd_merge_flag[ x0 ][ y0 ] == 1 ) { | |
| ciip_mmvd_distance_idx[ x0 ][ y0 ] | ae(v) |
| ciip_mmvd_direction_idx[ x0 ][ y0 ] | ae(v) |
| } | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| } | |

FIG. 16

| } else { | |
|---|---|
| if( sps_ciip_enabled_flag && sps_gpm_enabled_flag &&<br>sh_slice_type = = B &&00<br>cu_skip_flag[ x0 ][ y0 ] = = 0 && cbWidth >= 8 && cbHeight >= 8 &&<br>cbWidth < ( 8 * cbHeight ) && cbHeight < ( 8 * cbWidth ) &&<br>cbWidth < 128 && cbHeight < 128 ) | |
| ciip_flag[ x0 ][ y0 ] | ae(v) |
| ~~if( ciip_flag[ x0 ][ y0 ] && MaxNumMergeCand > 1 )~~ | |
| ~~merge_idx[ x0 ][ y0 ]~~ | ~~ae(v)~~ |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| } | |

*FIG. 17*

| | |
|---|---|
| if( !ciip_flag[ x0 ][ y0 ] ) { | |
| if( gpm_mmvd_enabled_flag ) { | |
| gpm_mmvd_merge_idx0_flag[ x0 ][ y0 ] | ae(v) |
| gpm_mmvd_merge_idx1_flag[ x0 ][ y0 ] | ae(v) |
| } | |
| merge_gpm_partition_idx[ x0 ][ y0 ] | ae(v) |
| merge_gpm_idx0[ x0 ][ y0 ] | ae(v) |
| if( gpm_mmvd_merge_idx0_flag[ x0 ][ y0 ] = = 1 ) { | |
| gpm_mmvd_distance_idx_idx0[ x0 ][ y0 ] | ae(v) |
| gpm_mmvd_direction_idx_idx0[ x0 ][ y0 ] | ae(v) |
| } | |
| if( MaxNumGpmMergeCand > 2 ) | |
| merge_gpm_idx1[ x0 ][ y0 ] | ae(v) |
| if( gpm_mmvd_merge_idx1_flag[ x0 ][ y0 ] = = 1 ) { | |
| gpm_mmvd_distance_idx_idx1[ x0 ][ y0 ] | ae(v) |
| gpm_mmvd_direction_idx_idx1[ x0 ][ y0 ] | ae(v) |
| } | |
| } | |

FIG. 18

| | |
|---|---|
| if( !ciip_flag[ x0 ][ y0 ] ) { | |
| if( gpm_mmvd_enabled_flag ) | |
| gpm_mmvd_merge_flag[ x0 ][ y0 ] | ae(v) |
| if( gpm_mmvd_merge_flag[ x0 ][ y0 ] = = 1 ) { | |
| gpm_mmvd_distance_idx[ x0 ][ y0 ] | ae(v) |
| gpm_mmvd_direction_idx[ x0 ][ y0 ] | ae(v) |
| } | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |

*FIG. 21*

VIDEO ENCODING/DECODING METHOD AND APPARATUS APPLYING A MERGE MODE WITH MOTION VECTOR DIFFERENCE TO COMBINED AN INTER/INTRA PREDICTION MODE OR A GEOMETRIC PARTITIONING MODE

CROSS-REFERENCE TO RELATED APPLICATIONS

This application is a continuation of International Application No. PCT/KR2022/014806, filed on Sep. 30, 2022, which claims priority to and the benefit of Korean Patent Application No. 10-2021-0131037 filed on Oct. 1, 2021, and Korean Patent Application No. 10-2022-0124104 filed on Sep. 29, 2022, the entire disclosures of each of which are incorporated herein by reference.

TECHNICAL FIELD

The present disclosure relates to a video encoding/decoding method and a video encoding/decoding apparatus applying a Merge mode with Motion Vector Difference (MMVD) to a combined inter/intra prediction (CIIP) mode or a geometric partitioning mode. More particularly, the present disclosure relates to a video encoding/decoding method and a video encoding/decoding apparatus for generating a predicted block of the current block by applying a merge mode with motion vector difference to a CIIP mode or a geometric partitioning mode.

BACKGROUND

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

The combined inter/intra prediction (CIIP) mode is a method of generating a prediction block of the current block by weighted averaging the intra-prediction signal and the inter-prediction signal. The geometric partitioning mode partitions a Coding Unit (CU) into two regions, performs inter prediction on the two regions independently to generate two inter-prediction signals and calculates a weighted average of the two generated inter-prediction signals to generate a prediction block of the current block. The merge with motion vector difference is adapted to add the motion vector difference to a motion vector induced in the regular merge mode to correct the motion vector. The motion vectors for use in generating inter-prediction blocks need to be corrected by applying the merge with motion vector difference to the CIIP mode or geometric partitioning mode.

SUMMARY

An object of the present disclosure is to provide a method and an apparatus for generating a prediction block of the current block based on a combined inter/intra prediction (CIIP) mode.

Another object of the present disclosure is to provide a method and an apparatus for generating a prediction block of the current block based on a geometric partitioning mode.

Another object of the present disclosure is to provide a method and an apparatus for applying a merge with motion vector difference to a CIIP mode.

Another object of the present disclosure is to provide a method and an apparatus for applying a merge with motion vector difference to a geometric partitioning mode.

Another object of the present disclosure is to provide a method and an apparatus for improving video encoding/decoding efficiency.

Another object of the present disclosure is to provide a recording medium that stores a bitstream generated by a video encoding/decoding method or a video encoding/decoding apparatus of the present disclosure.

Another object of the present disclosure is to provide a method and an apparatus for transmitting a bitstream generated by a video encoding/decoding method or an apparatus of the present disclosure.

According to a present disclosure, a video decoding method includes determining whether to apply a combined inter/intra prediction (CIIP) mode or a geometric partitioning mode. The video decoding method also includes deriving a motion vector from a merge candidate list. The video decoding method also includes correcting the motion vector by using motion vector difference information. The video decoding method also includes generating a prediction block of a current block based on a corrected motion vector.

According to the present disclosure, a video encoding method includes determining whether to apply a CIIP mode or a geometric partitioning mode. The video encoding method also includes determining a motion vector from a merge candidate list. The video encoding method also includes correcting the motion vector by using motion vector difference information. The video encoding method also includes generating a prediction block of a current block based on a corrected motion vector.

In addition, according to the present disclosure, it is possible to provide a method of transmitting a bitstream generated by the video encoding method or the video encoding apparatus according to the present disclosure.

In addition, according to the present disclosure, it is possible to provide a recording medium storing a bitstream generated by the video encoding method or the video encoding apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus for generating a prediction block of the current block based on a combined inter/intra prediction (CIIP) mode are provided.

In addition, according to the present disclosure, the method and an apparatus for generating a prediction block of the current block based on a geometric partitioning mode are provided.

In addition, according to the present disclosure, the method and an apparatus for applying the merge with motion vector difference to a CIIP mode may be provided.

In addition, according to the present disclosure, the method and an apparatus for applying the merge with motion vector difference to a geometric partitioning mode are provided.

In addition, according to the present disclosure, the method and an apparatus for improving video encoding/decoding efficiency are provided.

The effects that may be obtained from the present disclosure are not limited to the effects mentioned above, and other effects not mentioned may be clearly understood by those having ordinary skill in the art from the description below.

BRIEF DESCRIPTION OF THE DRAWINGS

FIG. 8 is a diagram illustrating a method of determining a weight value in a combined inter/intra prediction mode, according to at least one embodiment of the present disclosure.

FIG. 11 is a diagram illustrating a lookup table of partition direction information in geometric partitioning mode, according to at least one embodiment of the present disclosure.

FIG. 12 is a diagram illustrating the direction information of a motion vector difference, according to at least one embodiment of the present disclosure.

FIG. 13 is a diagram illustrating distance information of a motion vector difference, according to at least one embodiment of the present disclosure.

FIG. 15 is a diagram illustrating the direction information of a motion vector difference, according to another embodiment of the present disclosure.

FIG. 16 is a diagram illustrating a syntax structure when applying a merge with motion vector difference to a combined inter/intra prediction mode, according to at least one embodiment of the present disclosure.

FIG. 17 is a diagram illustrating a syntax structure in a combined inter/intra prediction mode, according to at least one embodiment of the present disclosure.

FIG. 18 is a diagram illustrating a syntax structure when applying a merge with motion vector difference to a geometric partitioning mode, according to at least one embodiment of the present disclosure.

FIG. 21 is a diagram illustrating a syntax structure when applying a merge with motion vector difference to a geometric partitioning mode, according to another embodiment of the present disclosure.

DETAILED DESCRIPTION

Figure 1:
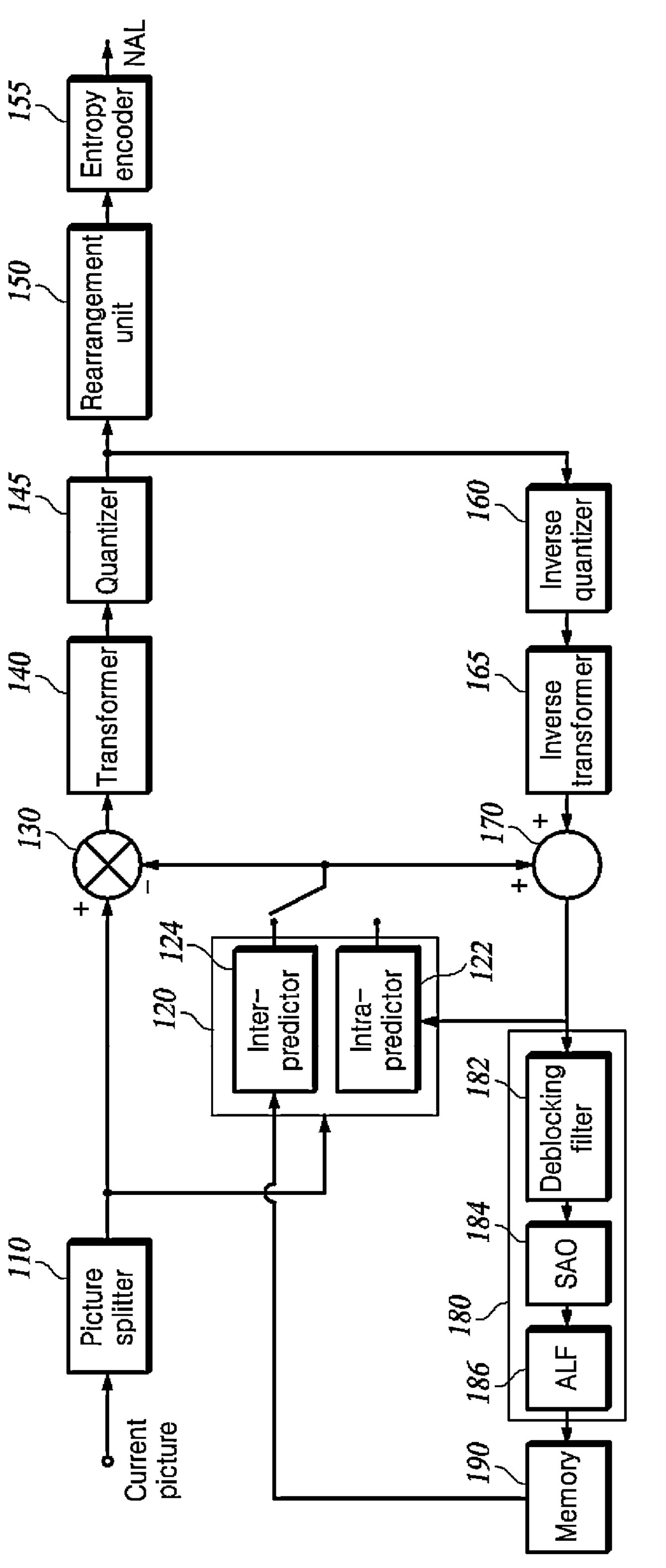
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
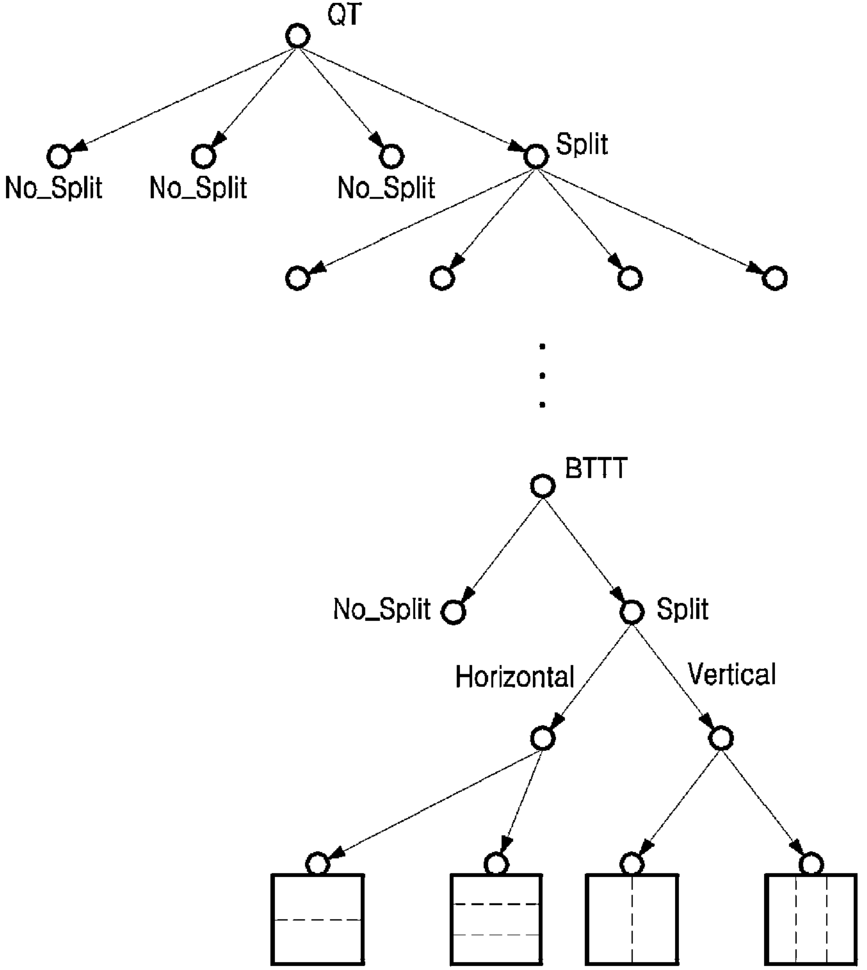
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
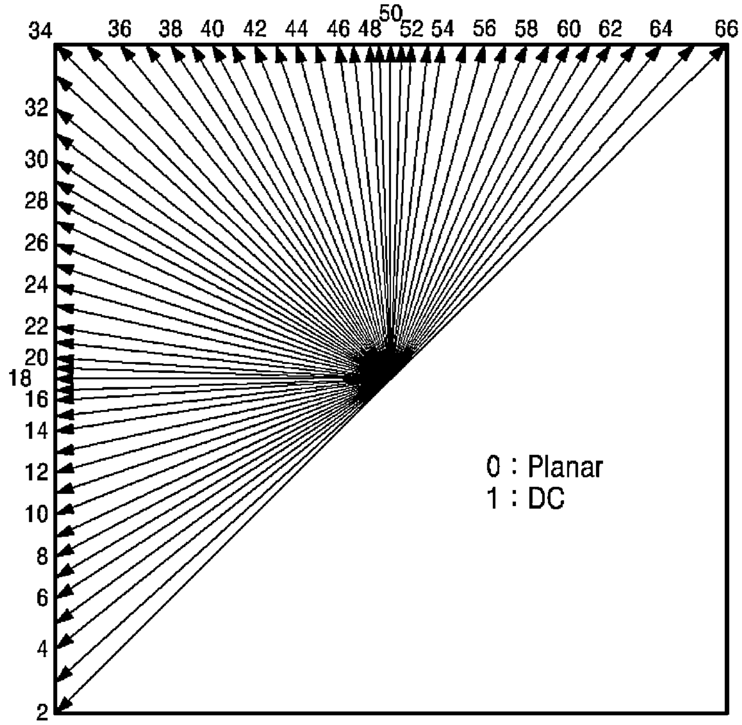
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
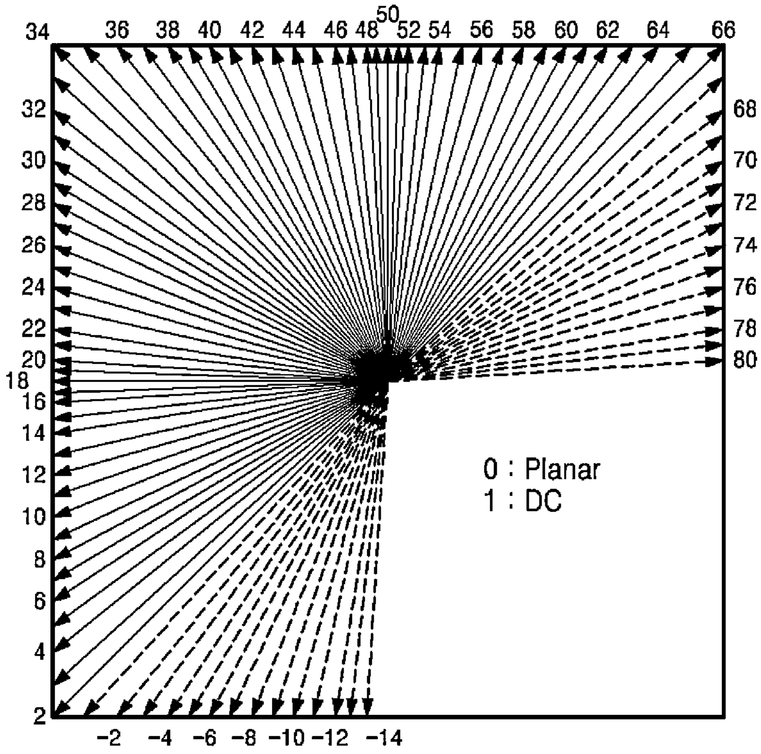

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
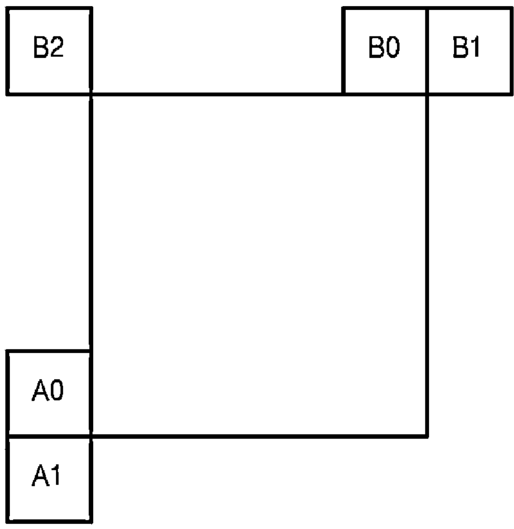
FIG. 4 is a diagram illustrating neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
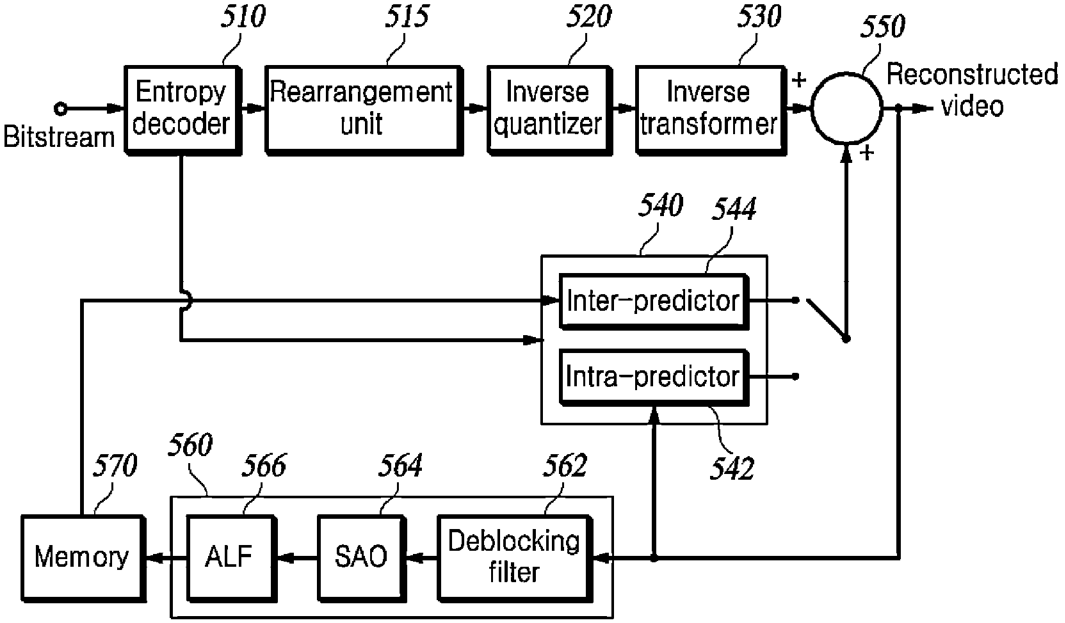
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
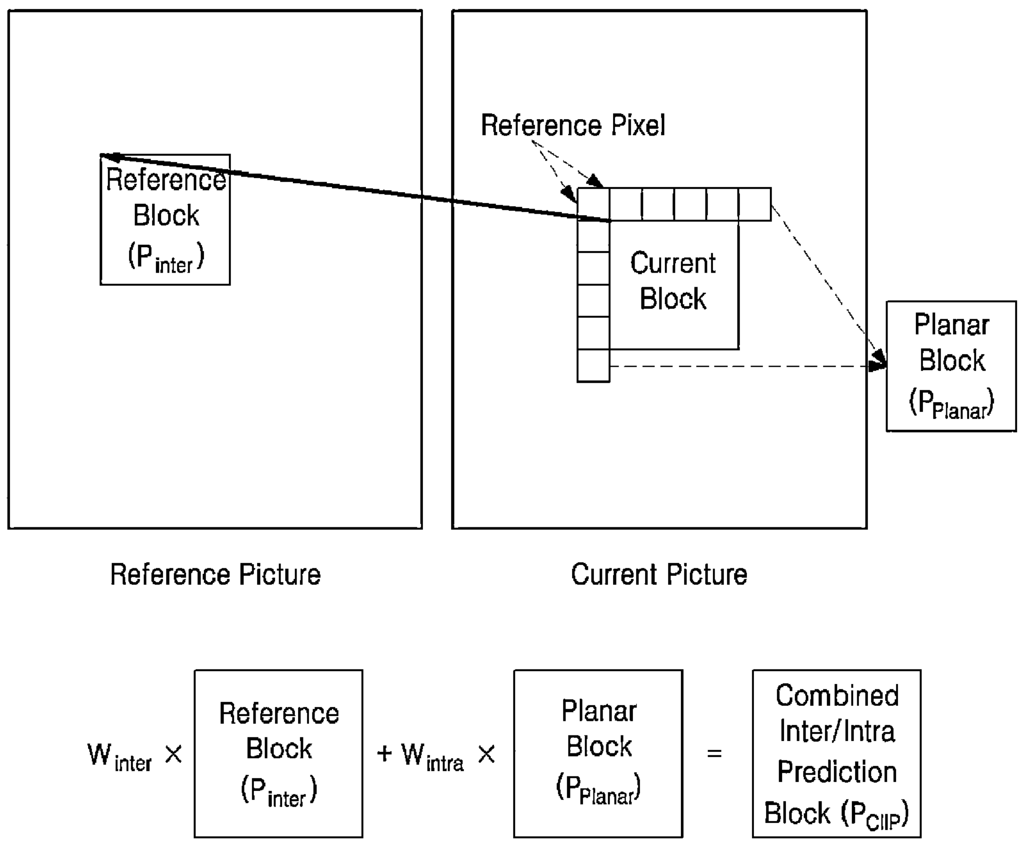
FIG. 6 is a diagram illustrating a method of generating a prediction block of the current block in a combined inter/intra prediction (CIIP) mode.

FIG. 6 is a diagram illustrating a method of generating a prediction block of the current block in combined inter/intra prediction (CIIP) mode. The term intra-screen prediction mode may be the equivalent of intra-prediction mode. The terms "intra-screen prediction mode" and "intra-prediction mode" may be used interchangeably. The term "inter-screen prediction mode" may be the equivalent of "inter-prediction mode." The terms "inter-screen prediction mode" and "inter-prediction mode" may be used interchangeably. The term "combined inter/intra screen prediction mode" may be the equivalent of "combined inter/intra prediction mode." The "combined inter/intra prediction mode" and "CIIP mode" may be used interchangeably. In the CIIP mode, an inter-prediction block may be generated in the same way as in the regular merge mode. An intra-prediction block may be generated by applying planar mode to reference pixels that are neighbors of the current block. By applying weights to the generated inter-prediction block and intra-prediction block, a final CIIP-based prediction block may be generated.

Figure 7:
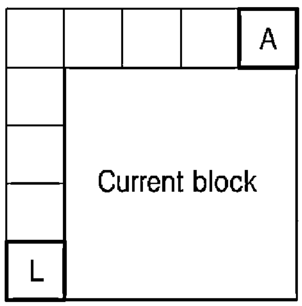
FIG. 7 is a diagram illustrating neighboring blocks that are referenced to determine a weight value in a combined inter/intra prediction mode, according to at least one embodiment of the present disclosure.

Referring to FIG. 6, based on the merge mode, a reference block ($P_{inter}$) in the reference picture may be derived. An intra-prediction block ($P_{Planar}$) may be generated by applying the planer mode to reference pixels neighboring the current block. By applying weights to this reference block ($P_{inter}$) and intra-prediction block ($P_{Planar}$), a CIIP-based prediction block ($P_{CIIP}$) may be generated. The weight value applied to the reference block ($P_{inter}$) may be equivalent to $W_{inter}$. The weight value applied to the intra-prediction block ($P_{Planar}$) may be equivalent to $W_{intra}$. The CIIP-based prediction block ($P_{CIIP}$) may be generated by using the equation of $P_{CIIP}=((4-w)\times P_{inter}+w\times P_{Planar}+2)>>2$ FIG. 7 is a diagram illustrating neighboring blocks that are referenced to determine a weight value in the combined inter/intra prediction mode, according to at least one embodiment of the present disclosure. In CIIP mode, the weight value may be determined by taking into account whether and how many neighboring blocks of the current block encode intra-prediction mode.

Referring to FIG. 7, in the CIIP mode, the weight value may be determined by considering whether an upper neighboring block A and a left neighboring block L of the current block perform encoding of intra-prediction mode.

FIG. 8 is a diagram illustrating a method of determining a weight value in a combined inter/intra prediction mode, according to at least one embodiment of the present disclosure. If more neighboring blocks of the current block encode the intra-prediction mode, an intra-prediction block may be given a large weight value. Conversely, if fewer neighboring blocks of the current block encode intra-prediction modes, the intra-prediction block may be given a small weight value.

Referring to FIG. 8, if the upper neighboring block A and the left neighboring block L of the current block in FIG. 7 encode the intra-prediction mode, the weight value assigned to the intra-prediction block may be equal to 3. If the upper neighboring block A encodes the intra-prediction mode and the left neighboring block L does not encode the intra-prediction mode, the weight value assigned to the intra-prediction block may be equal to 2. If the upper neighboring block A does not encode intra-prediction mode and the left neighboring block L encodes intra-prediction mode, the weight value assigned to the intra-prediction block may be equal to 2. If neither the upper neighboring block A nor the left neighboring block L encodes the intra-prediction mode, the weight value assigned to the intra-prediction block may be equal to 1.

Figure 9:
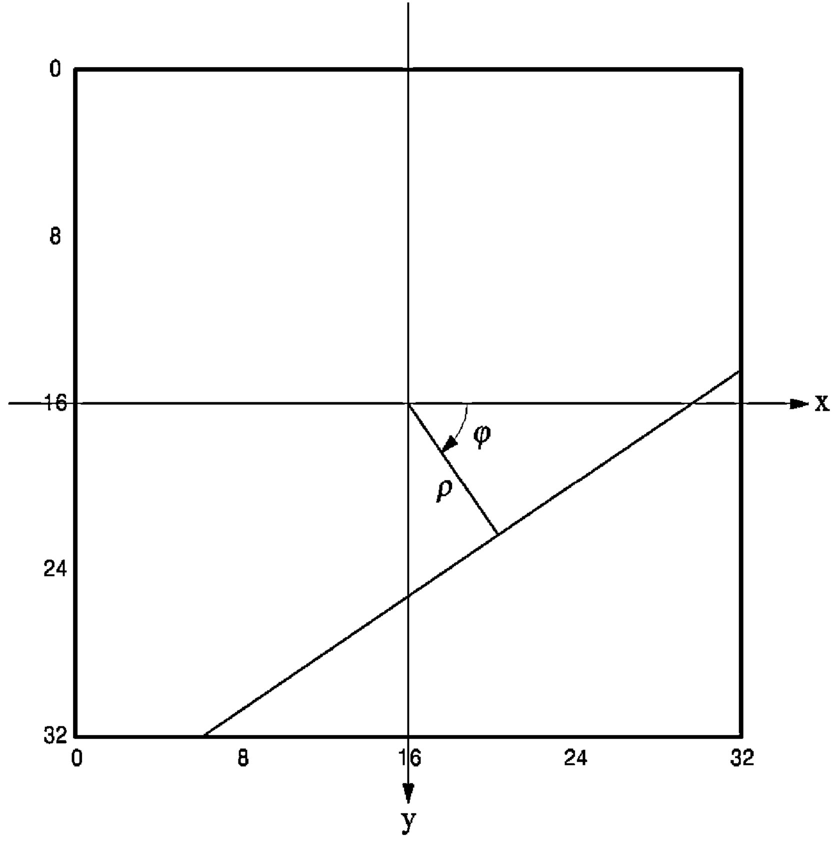
FIG. 9 is a diagram illustrating a method of applying a geometric partitioning mode to a 32×32 block, according to at least one embodiment of the present disclosure.

FIG. 9 is a diagram illustrating a method of applying a geometric partitioning mode to a 32×32 block, according to at least one embodiment of the present disclosure. As for the geometric partitioning mode, in that mode, a coding unit may be partitioned into two regions by a straight partitioning line. Each of the two partitioned regions may perform inter prediction by using different motion information. An inter-prediction block for each of the two partitioned regions may be generated. By weighted averaging the two generated inter-prediction blocks, a final prediction block in the geometric partitioning mode may be generated. The geometric partitioning mode uses an angle parameter and a distance parameter to set partitioning boundary regions defined by a straight line. The weighted averaging may be equivalent in meaning to weighted summing.

Referring to FIG. 9, the 32×32 block may be partitioned into two regions. Inter prediction may be performed for each of the two partitioned regions. φ may be equivalent to an angle parameter. ρ may be equivalent to a distance parameter. Using the angle parameter and the distance parameter, a straight line may be established that divides the 32×32 block.

Figure 10A:
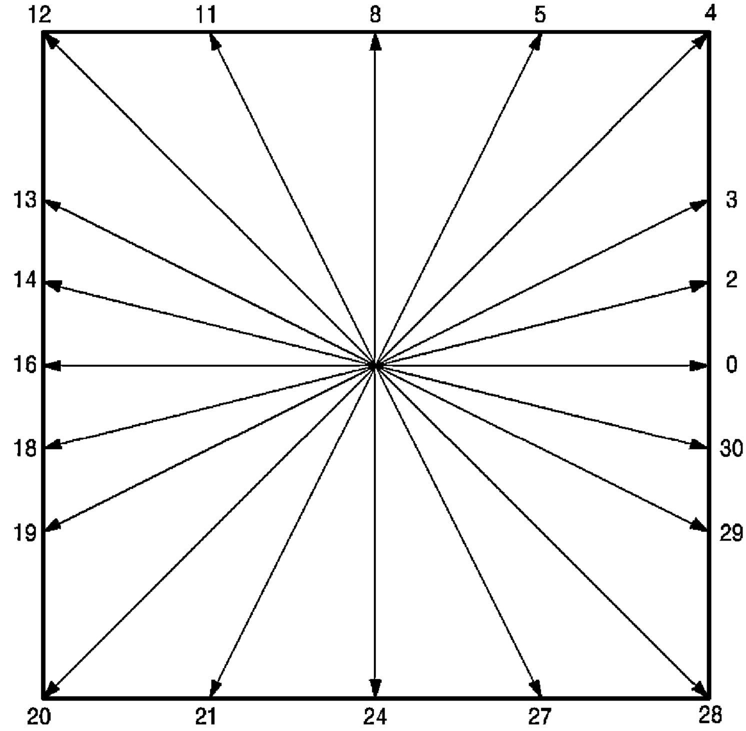
FIG. 10A and FIG. 10B are diagrams illustrating an angle parameter and a distance parameter in geometric partitioning mode, according to some embodiments of the present disclosure.
Figure 10B:
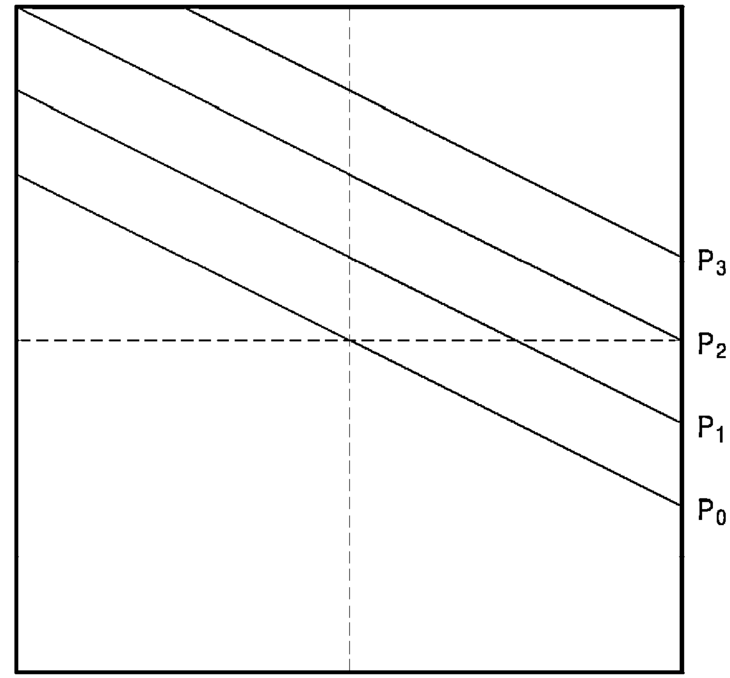

FIG. 10A and FIG. 10B are diagrams illustrating an angle parameter and a distance parameter in geometric partitioning mode, according to some embodiments of the present disclosure.

Referring to FIG. 10A, the angle parameter may be defined by a total of 20 quantized angles by symmetrically dividing a 360-degree range within the coding unit.

Referring to FIG. 10B, the distance parameter may be defined by four quantized distances. Among the total of 80 possible partition directions that may occur with combinations of angle parameters and distance parameters, 10 redundant partition directions and 6 redundant partition directions with binary tree partitions and triple tree partitions may be excluded. This leaves a total of 64 partition directions that may be utilized by the geometric partitioning mode.

FIG. 11 is a diagram illustrating a lookup table of partition direction information in geometric partitioning mode, according to at least one embodiment of the present disclosure. Combinations of the angle parameters and the distance parameters may be defined as a look-up table. For each coding unit, the partition direction information may be transmitted. In the geometric partitioning mode, a merge candidate list, which is for the geometric partitioning mode and includes only unidirectional motion information, may be constructed from the regular merge candidate list. This can simplify the encoding of motion information and reduce the number of possible combinations. Using the merge candidate list for the geometric partitioning mode, the used merger index for each partitioned region may be transmitted.

Referring to FIG. 11, partition direction information (e.g., merge_gpm_partition_idx) may be determined based on information on angle parameters (e.g., angleIdx) and information on distance parameters (e.g., distanceIdx). The merge_gpm_partition_idx by the combinations of angleIdx and distanceIdx may be defined as the lookup table. The value of merge_gpm_partition_idx may be in the range from 0 to 63. A merge_gpm_partition_idx may be transmitted for each coding unit.

FIG. 12 is a diagram illustrating the direction information of a motion vector difference, according to at least one embodiment of the present disclosure. In the regular merge mode, the motion information in the merge candidate list is used as the motion information for the current block and no additional motion information is transmitted. The regular merge mode has the advantage of minimizing the amount of bits, but the regular merge mode has the limitation of not being able to express the optimal motion information. The merge with motion vector difference (MMVD) may compensate for the motion information by adding the motion vector difference to the motion vector derived by the regular merge mode.

To reduce complexity, the merge with motion vector difference uses only the first and second candidates from the list of candidates of the regular merge mode. Between the two candidates, one candidate may be selected, and the motion vector of that candidate may be set as the initial motion vector. The initial motion vector may be added with further motion vector difference information received to determine the final motion vector. The motion vector difference information may include direction information and distance information.

Referring to FIG. 12, the direction information of the motion vector difference may only allow for correction in the vertical or horizontal direction. The direction information of the motion vector difference may be composed of four directions. Index 0 may be assigned to the direction information of a motion vector difference that is corrected by +1 in the horizontal direction and 0 in the vertical direction. Index 1 may be assigned to the direction information of a motion vector difference that is corrected by −1 in the horizontal direction and 0 in the vertical direction. Index 2 may be assigned to the direction information of a motion vector difference that is corrected by 0 in the horizontal direction and +1 in the vertical direction. Index 3 may be assigned to the direction information of a motion vector difference that is corrected by 0 in the horizontal direction and −1 in the vertical direction.

FIG. 13 is a diagram illustrating distance information of a motion vector difference, according to at least one embodiment of the present disclosure.

Referring to FIG. 13, the distance information of the motion vector difference may be composed of a luma pixel distance that is a motion distance. The direction information of the motion vector difference may be composed of eight motion distances. Index 0 may be assigned to the distance information of the motion vector difference with a luma pixel distance of ¼. Index 1 may be assigned to the distance information of the motion vector difference with a luma pixel distance of ½. Index 2 may be assigned to the distance information of the motion vector difference with a luma pixel distance of 1. Index 3 may be assigned to the distance information of the motion vector difference with a luma pixel distance of 2. Index 4 may be assigned to the distance information of the motion vector difference with a luma pixel distance of 4. Index 5 may be assigned to the distance information of the motion vector difference with a luma pixel distance of 8. Index 6 may be assigned to the distance information of the motion vector difference with a luma pixel distance of 16. Index 7 may be assigned to the distance information of the motion vector difference with a luma pixel distance of 32.

Figure 14:
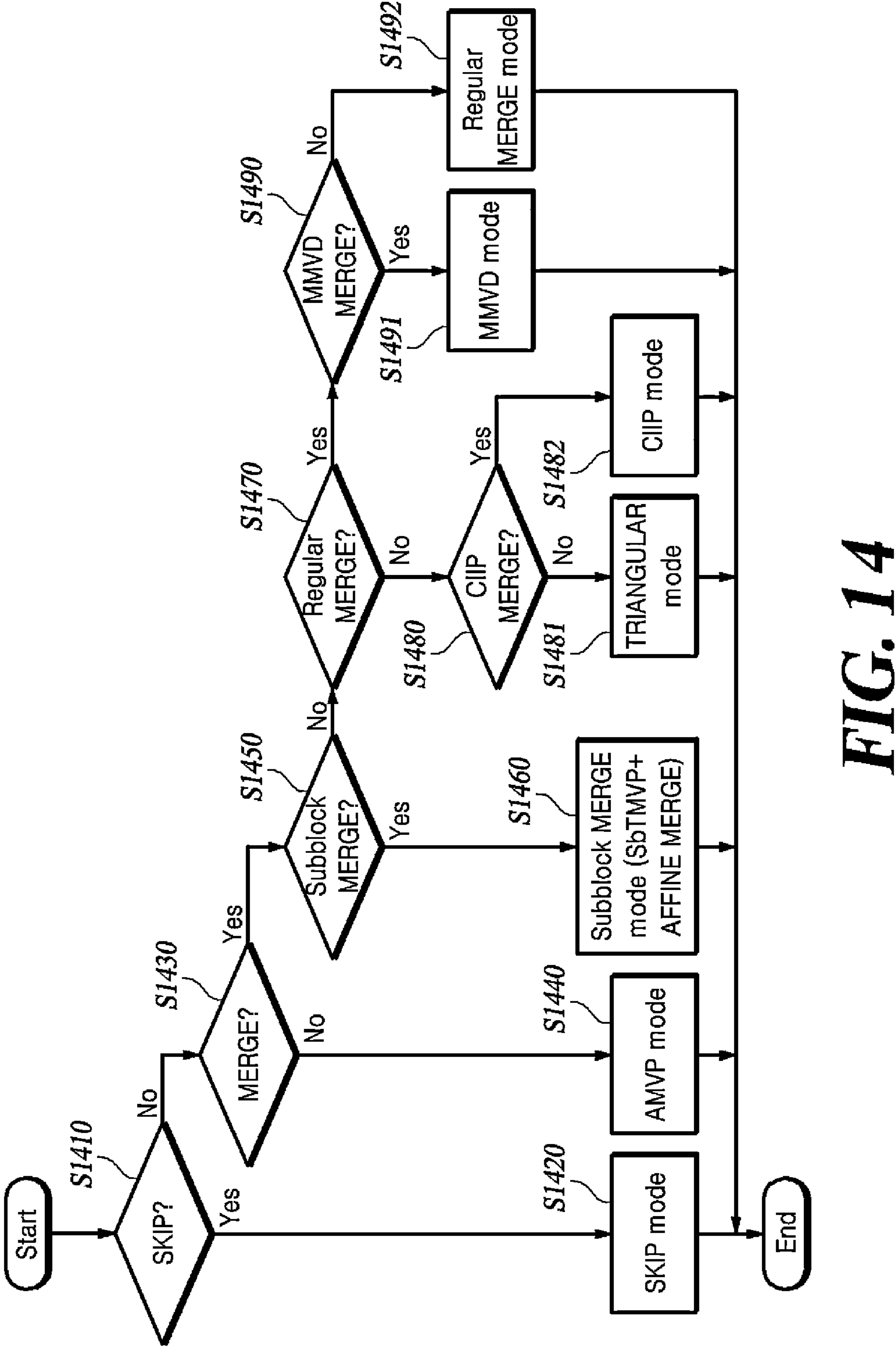
FIG. 14 is a diagram illustrating a flowchart of a process for applying inter prediction, according to at least one embodiment of the present disclosure.

FIG. 14 is a diagram illustrating a flowchart of a process for applying inter prediction, according to at least one embodiment of the present disclosure.

Referring to FIG. 14, it may be determined whether to apply a skip mode (S1410). If it is determined to apply the skip mode (S1410—YES), the skip mode may be applied (S1420). If the skip mode is determined not to be applied (S1410—NO), it may be determined whether to apply a merge mode (S1430). If the merge mode is determined not to be applied (S1430—NO), an Adaptive Motion Vector Prediction (AMVP) mode may be applied (S1440). If it is determined to apply the merge mode (S1430—YES), it may be determined whether to apply a subblock with the merge mode (S1450). If it is determined to apply the subblock with the merge mode (S1450—YES), the subblock may be subject to the merge mode (S1460). A subblock-based temporal motion vector estimation and AFFINE merge mode may be applied. If it is determined that no merge mode is applied to the subblock (S1450—NO), it may be determined whether to apply a regular merge mode (S1470).

If the regular merge mode is determined not to be applied (S1470—NO), it may be determined whether to apply a CIIP mode (S1480). If the CIIP mode is determined not to be applied (S1480—NO), then geometric partitioning mode may be applied (S1481). If the CIIP mode is determined to be applied (S1480—YES), the CIIP mode may be applied (S1482). If it is determined to apply the regular merge mode (S1470—YES), it may be determined whether to apply a merge with motion vector difference (S1490). If it is determined to apply the merge with motion vector difference (S1490—YES), the merge with motion vector difference may be applied (S1491). If it is determined that no merge with motion vector difference is applied (S1490—NO), the regular merge mode may be applied (S1492).

FIG. 15 is a diagram illustrating the direction information of a motion vector difference, according to another embodiment of the present disclosure. To improve the accuracy of the motion vector in a CIIP mode, an inter-prediction block may be generated considering the motion vector difference. By weighted averaging the thus generated inter-prediction block with the intra-prediction block, the prediction block of the current block may be generated. When generating inter-prediction blocks in CIIP mode, the motion vector of a candidate selected from the merge mode candidate list may be set as the initial motion vector. By adding the motion vector difference information to the initial motion vector, the final motion vector may be determined. The inter-prediction block derived from the final motion vector may be used as the inter-prediction block of the CIIP mode.

The motion vector difference information may be used as combinations of the four direction information described in FIG. 12 and the eight distance information described in FIG. 13. Diagonal direction information may be added to the four direction information described in FIG. 12.

Referring to FIG. 15, the direction information of the motion vector difference may include the four direction information described in FIG. 12 plus the diagonal direction information, for a total of eight direction information. Index 0 may be assigned to the direction information of a motion vector difference that is corrected by +1 in the horizontal direction and 0 in the vertical direction. Index 1 may be assigned to the direction information of a motion vector difference that is corrected by −1 in the horizontal direction and 0 in the vertical direction. Index 2 may be assigned to the direction information of a motion vector difference that is corrected by 0 in the horizontal direction and +1 in the vertical direction. Index 3 may be assigned to the direction information of a motion vector difference that is corrected by 0 in the horizontal direction and −1 in the vertical direction. Index 4 may be assigned to the direction information of a motion vector difference that is corrected by +1 in the horizontal direction and +1 in the vertical direction. Index 5 may be assigned to the direction information of a motion vector difference that is corrected by −1 in the horizontal direction and +1 in the vertical direction. Index 6 may be assigned to the direction information of a motion vector difference that is corrected by −1 in the horizontal direction and −1 in the vertical direction. Index 7 may be assigned to the direction information of a motion vector difference that is corrected by +1 in the horizontal direction and −1 in the vertical direction. Accordingly, the motion vector difference information may be used as combinations of the eight direction information and the eight distance information described in FIG. 13.

FIG. 16 is a diagram illustrating a syntax structure when applying a merge with motion vector difference to a combined inter/intra prediction mode, according to at least one embodiment of the present disclosure. When the merge with motion vector difference is applied to the CIIP mode, information on the motion vector difference is transmitted because the motion vector difference information is further used to correct the motion information. The method of transmitting or parsing the information on the motion vector difference may be the same as the method of transmitting or parsing the information on the motion vector difference in the merge mode.

Referring to FIG. 16, information indicating whether the merge with motion vector difference in CIIP mode is enabled (e.g., ciip_mmvd_enabled_flag) may be signaled in a sequence parameter set (sps) or picture parameter set (pps) or picture header (ph) or slice header (sh). To the current block, the Information indicating whether the merge with motion vector difference in CIIP mode is enabled (e.g., ciip_mmvd_merge_flag) may be signaled. Distance information (e.g., ciip_mmvd_distance_idx) of the motion vector difference used in CIIP mode and direction information (e.g., ciip_mmvd_direction_idx) of the motion vector difference used in CIIP mode may be signaled. The ciip_mmvd_direction_idx may represent the four direction information described in FIG. 12 or the eight direction information described in FIG. 15.

FIG. 17 is a diagram illustrating a syntax structure in a combined inter/intra prediction mode, according to at least one embodiment of the present disclosure.

Referring to FIG. 17, a merge index (e.g., merge_idx) may not be transmitted in CIIP mode. Signaling of merge_idx may be omitted by fixing merge_idx to zero. This can improve the coding efficiency.

FIG. 18 is a diagram illustrating a syntax structure when applying a merge with motion vector difference to the geometric partitioning mode, according to at least one embodiment of the present disclosure. Inter-prediction blocks may be generated for the two regions partitioned by using motion vector difference in the geometric partitioning mode. By joining the two generated inter-prediction blocks, the final prediction block for the geometric partitioning mode may be generated. By weighted averaging the two generated inter-prediction blocks, the final prediction block for the geometric partitioning mode may be generated. Here, the weights may correspond to arbitrary values. When generating the inter-prediction block for each of the two regions in the geometric partitioning mode, for each partitioned region, the motion vector of a candidate selected from the candidate list in the regular merge mode may be set as the initial motion vector. By summing the motion vector difference information and the initial motion vector, the final motion vector may be determined. The two partitioned regions may use the final motion vector to generate two inter-prediction blocks. The two inter-prediction blocks may be joined to generate the final prediction block for the geometric partitioning mode. The final prediction block for the geometric partitioning mode may be generated by weighted averaging of the two inter-prediction blocks. Here, the weights may correspond to arbitrary values.

Different motion vector differences may be applied to the two regions partitioned in the geometric partitioning mode. When applying different motion vector differences to two regions partitioned in the geometric partitioning mode, the final motion vector may be determined by independently applying motion vector difference information to the two partitioned regions. Accordingly, the motion vector difference information for each region may be transmitted independently. The method of transmitting or parsing the information on the motion vector differences may be the same as the method of transmitting or parsing the information on the motion vector differences in the merge mode.

Referring to FIG. 18, information indicating whether the merge with motion vector difference in geometric partitioning mode is enabled (e.g., gpm_mmvd_enabled_flag) may be signaled in a sequence parameter set or a picture parameter set or a picture header or a slice header. Information (e.g., gpm_mmvd_merge_idx0_flag) may be signaled indicating whether the first region partitioned in the geometric partitioning mode uses the merge with motion vector difference. Information (e.g., gpm_mmvd_merge_idx1_flag) may be signaled indicating whether the second region partitioned in the geometric partitioning mode uses the merge with motion vector difference.

The distance information of the motion vector difference used by the first partitioned region (e.g., gpm_mmvd_distance_idx_idx0) may be signaled. The distance information of the motion vector difference used by the second partitioned region (e.g., gpm_mmvd_distance_idx_idx1) may be signaled. The direction information of the motion vector difference used by the first partitioned region (e.g., gpm_mmvd_direction_idx_idx0) may be signaled. The direction information of the motion vector difference used by the second partitioned region (e.g., gpm_mmvd_direction_idx_idx1) may be signaled. The gpm_mmvd_direction_idx_idx0 and gpm_mmvd_direction_idx_idx1 may represent the four direction information described in FIG. 12 or the eight direction information described in FIG. 15.

Figure 19:
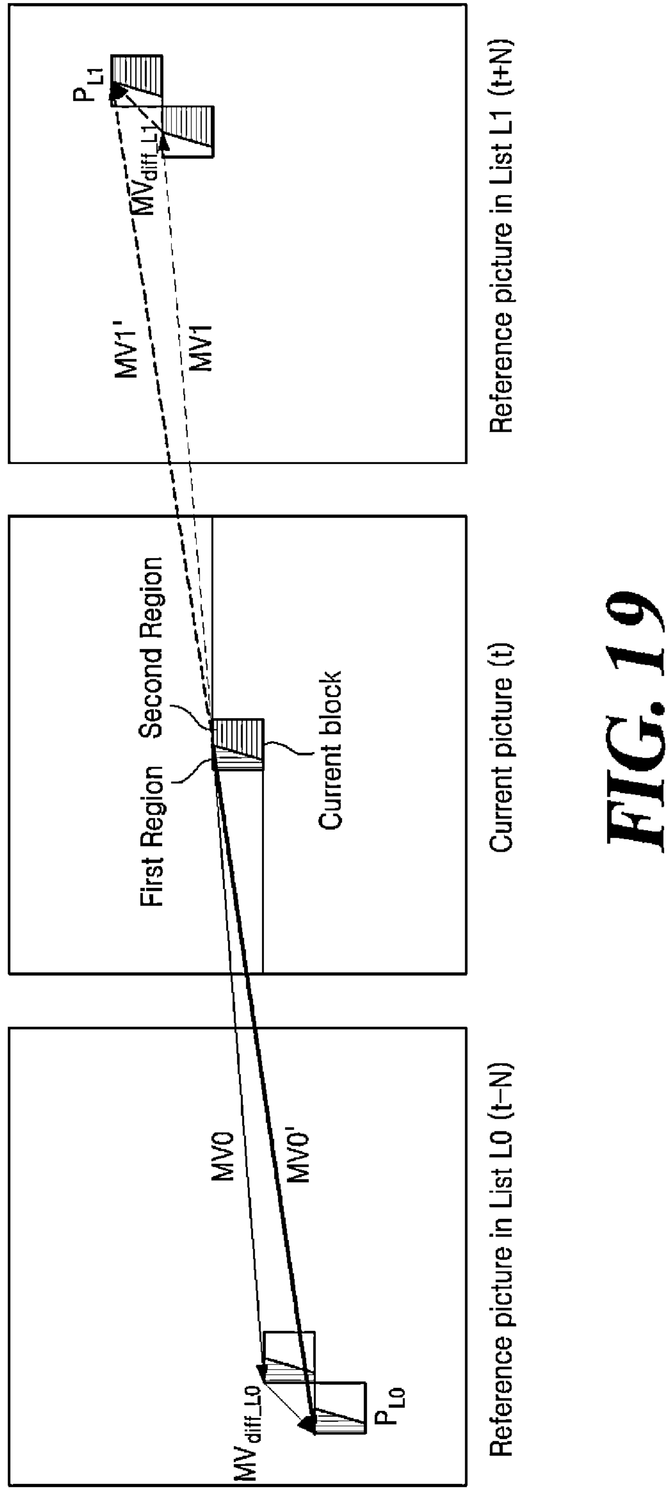
FIG. 19 is a diagram illustrating a process for deriving, from motion vector difference information of a first region partitioned in a geometric partitioning mode, motion vector difference information of a second partitioned region, according to at least one embodiment of the present disclosure.

FIG. 19 is a diagram illustrating a process for deriving, from motion vector difference information of a first region partitioned in the geometric partitioning mode, motion vector difference information of a second partitioned region, according to at least one embodiment of the present disclosure. The motion vector difference information of the second region may be derived by using the motion vector difference information of the first region in the geometric partitioning mode. In the geometric partitioning mode, the motion vector difference information of an arbitrary region may be used to derive the motion vector difference information of another region.

Referring to FIG. 19, in geometric partitioning mode, the current block may be partitioned into a first region and a second region. The first region may set the motion vector of a merge candidate selected from the merge candidate list to an initial motion vector MV0. The second region may set the motion vector of the merge candidate selected from the merge candidate list to an initial motion vector MV1. The first region refers to a reference picture in a reference picture list L0, and the second region refers to a reference picture in a reference picture list L1. Here, MV0 and MV1 may be equivalent to opposite directions.

The first region may sum the motion vector difference information $MV_{diff\_L0}$ and initial motion vector MV0 to determine the final motion vector MV0'. The second region may sum the motion vector difference information $MV_{diff\_L1}$ and initial motion vector MV1 to determine the final motion vector MV1'. MV0' and MV1' may correspond to opposite directions. The motion vector difference information $MV_{diff\_L0}$ for the first region and the motion vector difference information $MV_{diff\_L1}$ for the second region may also be in opposite directions. In this case, only the distance information of the motion vector difference for the first region and the direction information of the motion vector difference for the first region may be signaled. The distance information of the motion vector difference for the second region and the direction information of the motion vector difference for the second region may not be signaled. This is because the distance information of the motion vector difference for the second region is the same as the distance information of the motion vector difference for the first region, and the direction information of the motion vector difference for the second region is the opposite of the direction information of the motion vector difference for the first region.

In one example, the first region may set the motion vector of the merge candidate selected from the merge candidate list to the initial motion vector MV0. The second region may set the motion vector of the merge candidate selected from the merge candidate list to the initial motion vector MV1. The first region may refer to a reference picture in the reference picture list L0 and the second region may refer to a reference picture in the reference picture list L0. Alternatively, the first region may refer to a reference picture in the reference picture list L1 and the second region may refer to a reference picture in the reference picture list L1. The first region and the second region may refer to different reference pictures in the same reference picture list. Here, MV0 and MV1 may have the same direction, and the distance between the current picture and the reference picture that is indicated by MV0 may be different from the distance between the current picture and the reference picture that is indicated by MV1.

The first region may determine the final motion vector MV0' by summing the motion vector difference information $MV_{diff\_L0}$ and the initial motion vector MV0. The second region may determine the final motion vector MV1' by summing the motion vector difference information $MV_{diff\_L1}$ and the initial motion vector MV1. MV0' and MV1' may have the same direction, and the distance between the current picture and the reference picture that is indicated by MV0' may be different from the distance between the current picture and the reference picture that is indicated by MV1'.

The motion vector difference information $MV_{diff\_L0}$ of the first region and the motion vector difference information $MV_{diff\_L1}$ of the second region may have the same direction information and different distance information. In this case, only the distance information of the motion vector difference for the first region and the direction information of the motion vector difference for the first region may be signaled. The distance information of the motion vector difference for the second region and the direction information of the motion vector difference for the second region may not be signaled. This is because the distance information of the motion vector difference for the second region is derived by scaling the distance information of the motion vector difference for the first region, and the direction information of the motion vector difference for the second region is the same as the direction information of the motion vector difference for the first region. Here, the scaling may be performed by considering a difference between a picture order count or POC of the current picture and a POC of a reference picture in the reference picture list L0, which is referenced by the first region, and a difference between the POC of the current picture and a POC of a reference picture in the reference picture list L0, which is referenced by the second region.

Figure 20:
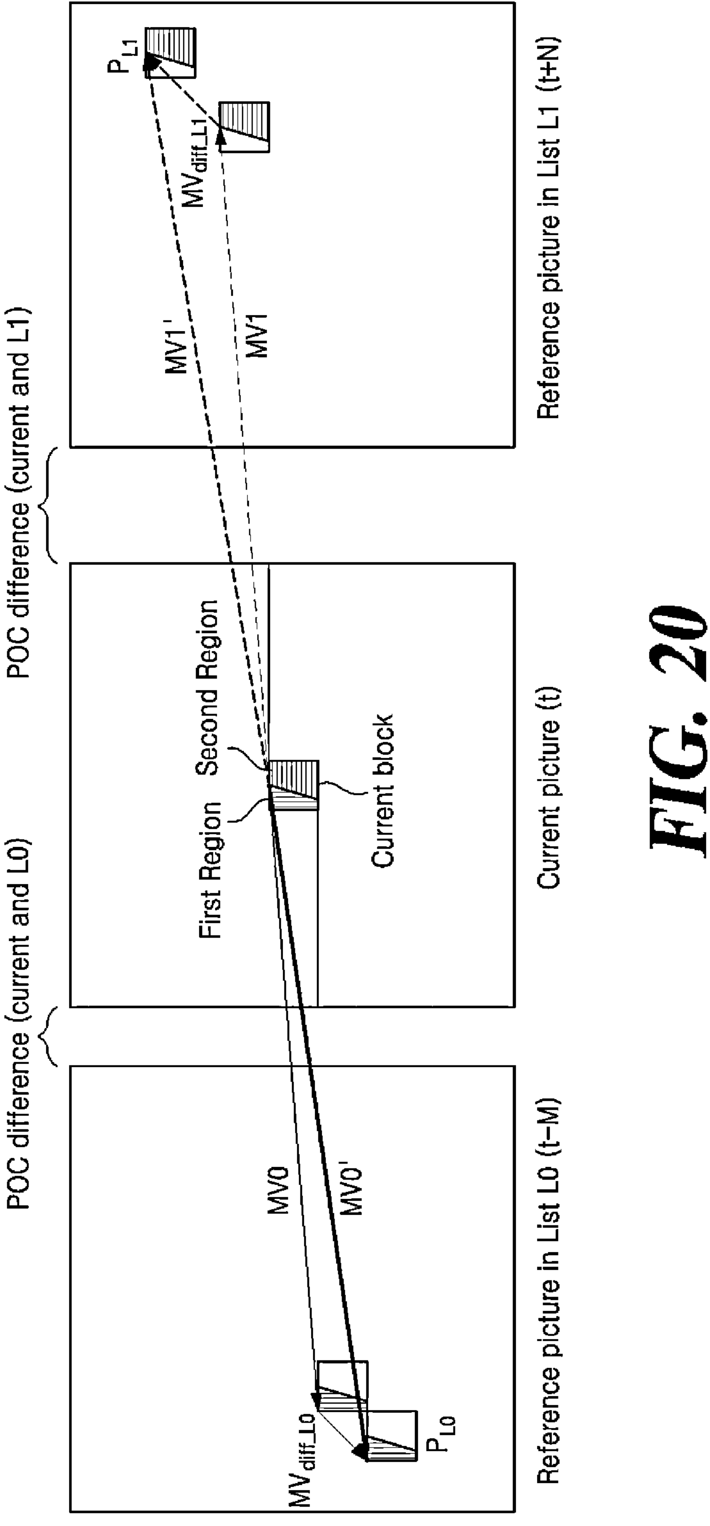
FIG. 20 is a diagram illustrating a process for deriving, from motion vector difference information of a first region partitioned in geometric partitioning mode, motion vector difference information of a second partitioned region, according to another embodiment of the present disclosure.

FIG. 20 is a diagram illustrating a process for deriving, from motion vector difference information of a first region partitioned in geometric partitioning mode, motion vector difference information of a second partitioned region, according to another embodiment of the present disclosure.

Referring to FIG. 20, in geometric partitioning mode, the current block may be partitioned into a first region and a second region. The first region may set the motion vector of a merge candidate selected from the merge candidate list to an initial motion vector MV0. The second region may set the motion vector of a merge candidate selected from the merge candidate list to an initial motion vector MV1. The first region refers to a reference picture in the reference picture list L0, and the second region may refer to a reference picture in the reference picture list L1. Here, MV0 and MV1 may be equivalent to opposite directions, and the distance between the current picture and the reference picture that is indicated by MV0 may be different from the distance between the current picture and the reference picture that is indicated by MV1.

The first region may determine the final motion vector MV0' by summing the motion vector difference information $MV_{diff\_L0}$ and the initial motion vector MV0. The second region may determine the final motion vector MV1' by summing the motion vector difference information $MV_{diff\_L1}$ and the initial motion vector MV1. MV0' and MV1' may be equivalent to opposite directions, and the distance between the current picture and the reference picture indicated by MV0' may be different from the distance between the current picture and the reference picture indicated by MV1'.

The motion vector difference information $MV_{diff\_L0}$ of the first region and the motion vector difference information $MV_{diff\_L1}$ of the second region may have opposite direction information and different distance information. In this case, only the distance information of the motion vector difference of the first region and the direction information of the motion vector difference of the first region may be signaled. The distance information of the motion vector difference for the second region and the direction information of the motion vector difference for the second region may not be signaled. This is because the distance information of the motion vector difference for the second region is derived by scaling the distance information of the motion vector difference for the first region, and the direction information of the motion vector difference for the second region is the direct opposite of the direction information of the motion vector difference for the first region. Here, the scaling may be performed by considering the difference between the POC of the current picture and the POC of the reference picture in the reference picture list L0, which is referenced by the first region, and the difference between the POC of the current picture and the POC of the reference picture in the reference picture list L1, which is referenced by the second region.

FIG. 21 is a diagram illustrating a syntax structure when applying a merge with motion vector difference to a geometric partitioning mode, according to another embodiment of the present disclosure. In geometric partitioning mode, the same motion vector difference may be applied to the two partitioned regions. When applying the same motion vector difference to the two regions partitioned in geometric partitioning mode, the final motion vector may be determined by applying the same motion vector difference information to the two partitioned regions. Accordingly, only one motion vector difference information piece may be transmitted. The method of transmitting or parsing the motion vector difference information may be the same as the method of transmitting or parsing the motion vector difference information in merge mode.

Referring to FIG. 21, information indicating whether the merge with motion vector difference in geometric partitioning mode is enabled (e.g., gpm_mmvd_enabled_flag) may be signaled in a sequence parameter set or a picture parameter set or a picture header or a slice header. Information (e.g., gpm_mmvd_merge_flag) may be signaled indicating whether the two regions partitioned by the geometric partitioning mode use the merge with motion vector difference.

The distance information of the motion vector difference used by the two partitioned regions (e.g., gpm_mmvd_distance_idx) may be signaled. The direction information of the motion vector difference used by the two partitioned regions (e.g., gpm_mmvd_direction_idx) may be signaled. The gpm_mmvd_direction_idx may be equivalent to the four direction information described in FIG. 12 or the eight direction information described in FIG. 15. When two regions partitioned by the geometric partitioning mode uses the merge with motion vector difference, the distance information of the motion vector difference and the direction information of the motion vector difference may be derived from gpm_mmvd_distance_idx and gpm_mmvd_direction_idx, respectively. The motion vector may be corrected by applying the distance information of the motion vector difference and the direction information of the motion vector difference equally to the motion vectors of the merge candidates in the two partitioned regions. By applying the same motion vector difference to the two regions partitioned in geometric partitioning mode, complexity can be reduced.

Figure 22:
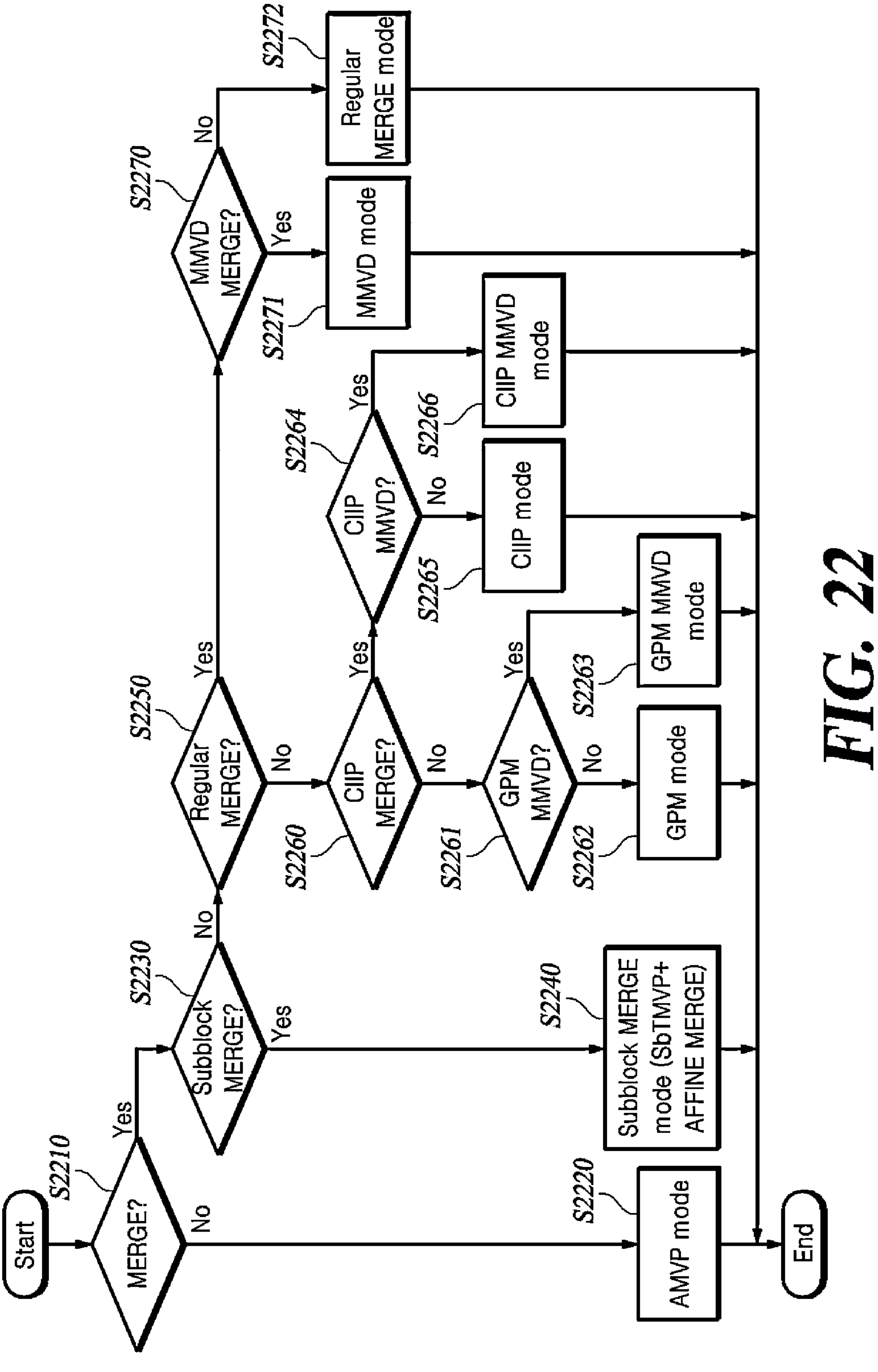
FIG. 22 is a flowchart of a process for applying inter prediction through applying a merge with motion vector difference, according to another embodiment of the present disclosure.

FIG. 22 is a flowchart of a process for applying inter prediction through applying a merge with motion vector difference, according to another embodiment of the present disclosure.

Referring to FIG. 22, it may be determined whether to apply a merge mode (S2210). If the merge mode is determined not to be applied (S2210—NO), the AMVP mode may be applied (S2220). If it is determined to apply the merge mode (S2210—YES), it may be determined whether a subblock is subject to merge mode (S2230). If it is determined to apply the subblock with the merge mode (S2230—YES), the subblock may be subject to the merge mode (S2240). A subblock-based temporal motion vector estimation and AFFINE merge mode may be applied. If it is determined that no merge mode is applied to the subblock (S2230—NO), it may be determined whether to apply a regular merge mode (S2250).

If the regular merge mode is determined not to be applied (S2250—NO), it may be determined whether to apply a CIIP mode (S2260). If the CIIP mode is determined not to be applied (S2260—NO), it may be determined whether to apply a geometric partitioning mode with a motion vector difference (S2261). If it is determined that no geometric partitioning mode with the motion vector difference is applied (S2261—NO), a geometric partitioning mode without motion vector difference may be applied (S2262). If it is determined to apply the geometric partitioning mode with motion vector difference (S2261—YES), the geometric partitioning mode with the motion vector difference may be applied (S2263). If it is determined to apply the CIIP mode (S2260—YES), it may be determined whether to apply the CIIP mode with the motion vector difference (S2264). If it is determined that no CIIP mode with the motion vector difference is applied (S2264—NO), the CIIP mode without the motion vector difference may be applied (S2265). If it is determined to apply the CIIP mode with motion vector difference (S2264—YES), the CIIP mode with the motion vector difference may be applied (S2266).

If it is determined to apply the regular merge mode (S2250—YES), it may be determined whether to apply the regular merge mode with the motion vector difference (S2270). If it is determined to apply the regular merge mode with the motion vector difference (S2270—YES), the regular merge mode with the motion vector difference may be applied (S2271). If it is determined that no regular merge mode with the motion vector difference is applied (S2270—NO), the regular merge mode without the motion vector difference may be applied (S2272).

Figure 23:
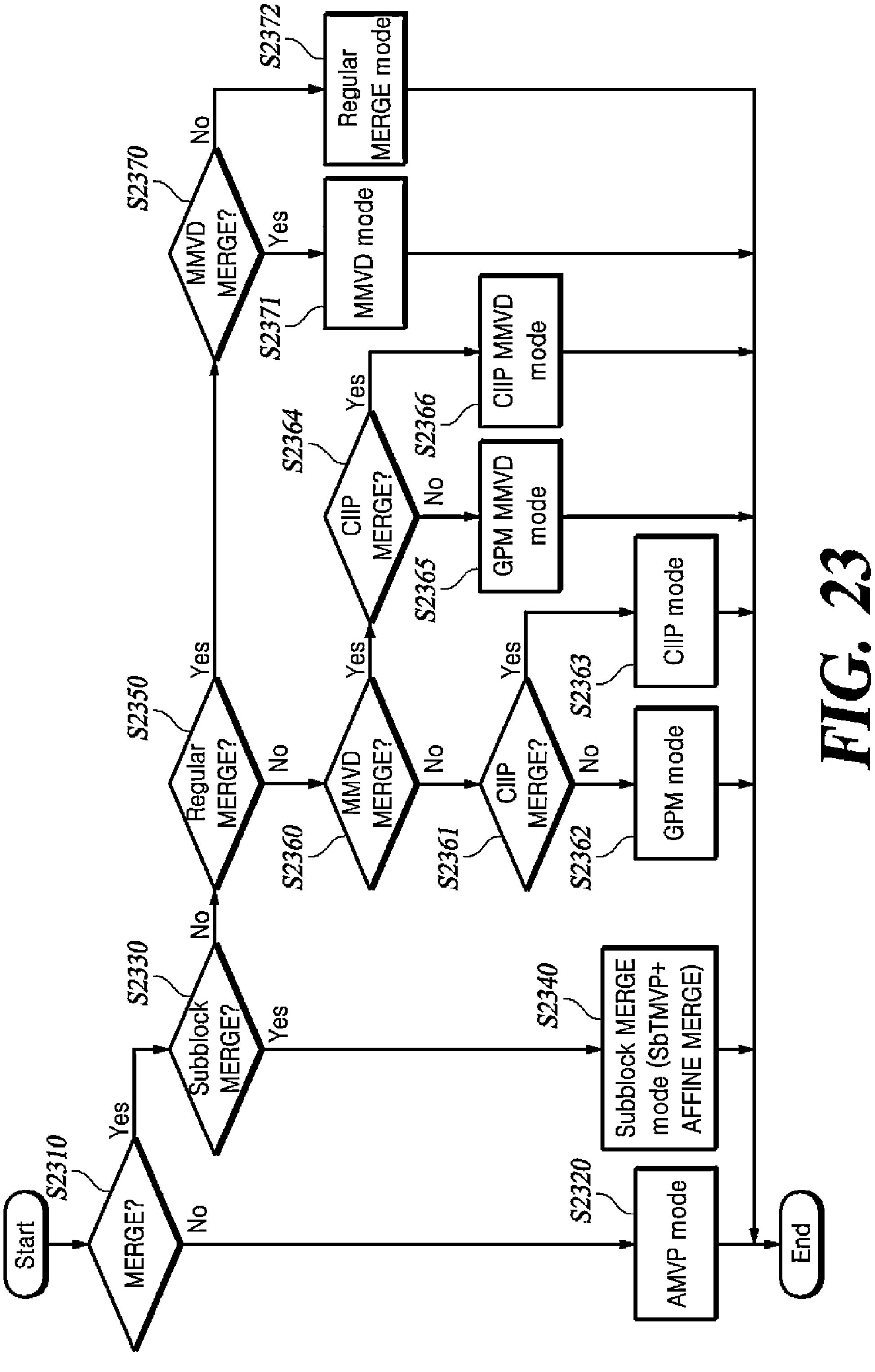
FIG. 23 is a flowchart of a process for applying inter prediction through applying a merge with motion vector difference, according to another embodiment of the present disclosure.

FIG. 23 is a flowchart of a process for applying inter prediction through applying a merge with motion vector difference, according to another embodiment of the present disclosure.

Referring to FIG. 23, it may be determined (S2310) whether to apply a merge mode. If the merge mode is determined not to be applied (S2310—NO), the AMVP mode may be applied (S2320). If it is determined to apply the merge mode (S2310—YES), it may be determined whether the subblock is subject to the merge mode (S2330). If it is determined that the subblock is applied with the merge mode (S2330—YES), the subblock may be subject to the merge mode (S2340). A subblock-based temporal motion vector estimation and AFFINE merge mode may be applied. If it is determined that no merge mode is applied to the subblock (S2330—NO), it may be determined whether to apply a regular merge mode (S2350).

If the regular merge mode is determined not to be applied (S2350—NO), it may be determined whether to use a motion vector difference (S2360). If it is determined not to use the motion vector difference (S2360—NO), it may be determined whether to use a CIIP mode (S2361). If the CIIP mode is determined not to be applied (S2361—NO), a geometric partitioning mode without the motion vector difference may be applied (S2362). If it is determined to apply the CIIP mode (S2361—YES), the CIIP mode without the motion vector difference may be applied (S2363). If it is determined to use the motion vector difference (S2360—YES), it may be determined whether to apply the CIIP mode (S2364). If the CIIP mode is determined not to be applied (S2364—NO), then the geometric partitioning mode with the motion vector difference may be applied (S2365). If the CIIP mode is determined to be applied (S2364—YES), the CIIP mode with the motion vector difference may be applied (S2366).

If it is determined to apply the regular merge mode (S2350—YES), it may be determined whether to apply the regular merge mode with the motion vector difference (S2370). If it is determined to apply the regular merge mode with the motion vector difference (S2370—YES), the regular merge mode with the motion vector difference may be applied (S2371). If it is determined that no regular merge mode with motion vector difference is applied (S2370—NO), a regular merge mode without the motion vector difference may be applied (S2372).

Figure 24:
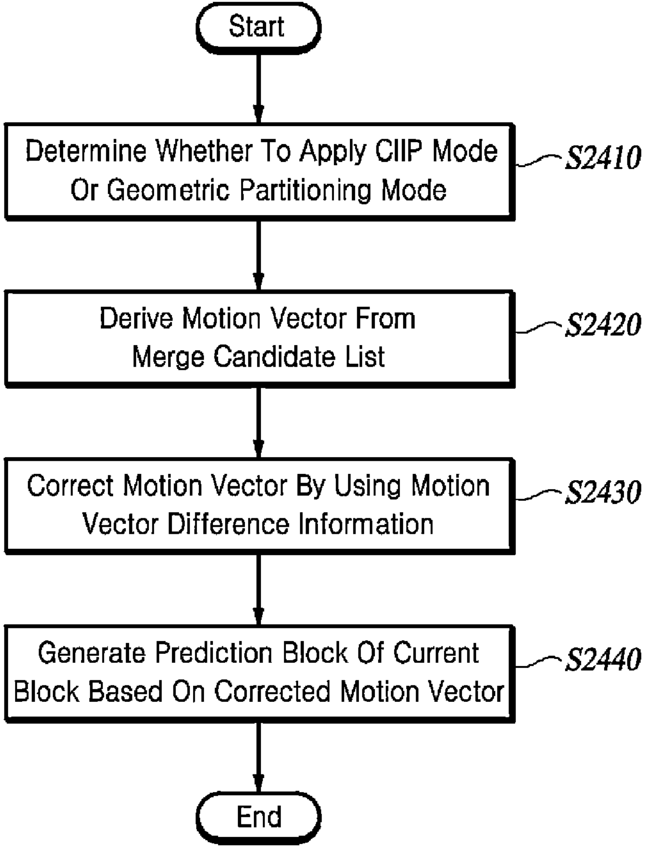
FIG. 24 is a diagram illustrating a video decoding process according to at least one embodiment of the present disclosure.

FIG. 24 is a diagram illustrating a video decoding process according to at least one embodiment of the present disclosure.

Referring to FIG. 24, the decoding apparatus may determine whether to apply CIIP mode or geometric partitioning mode (S2410). The decoding apparatus may derive a motion vector from a merge candidate list (S2420). If CIIP mode is applied, the step of deriving the motion vector from the merge candidate list may include deriving a motion vector from the first merge candidate in the merge candidate list. If the geometric partitioning mode is applied, the step of deriving the motion vector from the merge candidate list may include deriving a motion vector for each of the two regions partitioned from the merge candidate list.

The decoding apparatus may correct the motion vector by using the motion vector difference information (S2430). If the geometric partitioning mode is applied and two partitioned regions utilize different motion vector difference information, the step of correcting the motion vector may include correcting the motion vector for each of the two partitioned regions by using the different motion vector difference information. If the geometric partitioning mode is applied and the two partitioned regions utilize the same motion vector difference information, the step of correcting the motion vector may include correcting the motion vector for each of the two partitioned regions by using the same motion vector difference information. The motion vector difference information may include direction information and distance information. The direction information may include four or eight information, and the distance information may include eight information. The decoding apparatus may generate a predicted block of the current block based on the corrected motion vector (S2440).

If the CIIP mode is applied, the step of generating the prediction block of the current block may include generating, based on the corrected motion vectors, an inter-prediction block for the current block, generating an intra-prediction block for the current block based on at least one reference block adjacent to the current block, and generating the prediction block of the current block by weighted averaging the inter-prediction block and the intra-prediction block. When the geometric partitioning mode is applied, the step of generating the prediction block for the current block may include generating an inter-prediction block for each of the two partitioned regions by using the corrected motion vector and may include combining or weighted averaging the respective inter-prediction blocks for the two partitioned regions to generate the prediction block for the current block.

Figure 25:
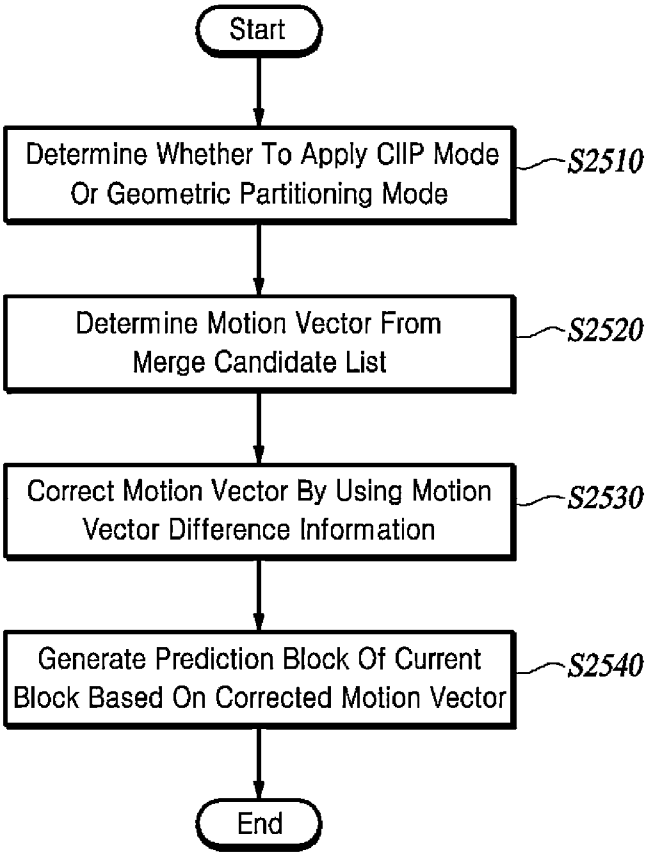
FIG. 25 is a diagram illustrating a video encoding process according to at least one embodiment of the present disclosure.

FIG. 25 is a diagram illustrating a video encoding process according to at least one embodiment of the present disclosure.

Referring to FIG. 25, the encoding apparatus may determine whether to apply CIIP mode or geometric partitioning mode (S2510). The encoding apparatus may determine a motion vector from the merge candidate list (S2520). If the CIIP mode is applied, the step of determining the motion vector from the merge candidate list may include determining the motion vector from the first merge candidate in the merge candidate list. If the geometric partitioning mode is applied, the step of determining the motion vector from the merge candidate list may include determining a motion vector for each of the two regions partitioned from the merge candidate list.

The encoding apparatus may correct the motion vectors by using the motion vector difference information (S2530). If the geometric partitioning mode is applied and the two partitioned regions utilize different motion vector difference information, the step of correcting the motion vector may include correcting the motion vector for each of the two partitioned regions by using the different motion vector difference information. If the geometric partitioning mode is applied and the two partitioned regions utilize the same motion vector difference information, the step of correcting the motion vector may include correcting the motion vector for each of the two partitioned regions by using the same motion vector difference information. The motion vector difference information may include direction information and distance information. The direction information may include four or eight pieces of information, and the distance information may include eight pieces of information. The encoding apparatus may generate a prediction block of the current block based on the corrected motion vectors (S2540).

When the CIIP mode is applied, the step of generating the prediction block of the current block may include generating, based on the corrected motion vectors, an inter-prediction block for the current block, generating an intra-prediction block for the current block based on at least one reference block adjacent to the current block, and generating the prediction block for the current block by weighted averaging the inter-prediction block and the intra-prediction block. When the geometric partitioning mode is applied, the step of generating the prediction block for the current block may include generating an inter-prediction block for each of the two partitioned regions by using the corrected motion vector and may include combining or weighted averaging the respective inter-prediction blocks for the two partitioned regions to generate the prediction block for the current block.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMBER

122: intra predictor
510: entropy decoder
542: intra predictor

What is claimed is:

1. A video decoding method, comprising:
determining whether to apply a geometric partitioning mode;
deriving a motion vector from a merge candidate list;
correcting the motion vector by using motion vector difference information; and
generating a prediction block of a current block based on a corrected motion vector,
wherein the motion vector difference information includes direction information and distance information, and
wherein the direction information indicates one direction selected from a predetermined direction set, the predetermined direction set including four diagonal directions.

2. The video decoding method of claim 1, wherein, when the geometric partitioning mode is applied, deriving the motion vector from the merge candidate list comprises:
deriving a motion vector for each of two partitioned regions from the merge candidate list.

3. The video decoding method of claim 2, wherein correcting the motion vector, when the two partitioned regions use different motion vector difference information, comprises:
correcting the motion vector for each of the two partitioned regions by using the different motion vector difference information.

4. The video decoding method of claim 2, wherein correcting the motion vector, when the two partitioned regions use same motion vector difference information, comprises:
correcting the motion vector for each of the two partitioned regions by using the same motion vector difference information.

5. The video decoding method of claim 3, wherein generating the prediction block of the current block comprises:
generating an inter-prediction block for each of the two partitioned regions by using the corrected motion vector; and
generating the prediction block of the current block by combining or weighted averaging inter-prediction blocks for the two partitioned regions.

6. The video decoding method of claim 4, wherein generating the prediction block of the current block comprises:
generating an inter-prediction block for each of the two partitioned regions by using the corrected motion vector; and
generating the prediction block of the current block by combining or weighted averaging inter-prediction blocks for the two partitioned regions.

7. A video encoding method, comprising:
determining whether to apply a geometric partitioning mode;

determining a motion vector from a merge candidate list;

correcting the motion vector by using motion vector difference information; and generating a prediction block of a current block based on a corrected motion vector, wherein the motion vector difference information includes direction information and distance information, and wherein the direction information indicates one direction selected from a predetermined direction set, the predetermined direction set including four diagonal directions.

8. The video encoding method of claim 7, wherein, when the geometric partitioning mode is applied, determining the motion vector from the merge candidate list comprises:

determining a motion vector for each of two partitioned regions from the merge candidate list.

9. The video encoding method of claim 8, wherein correcting the motion vector, when the two partitioned regions use different motion vector difference information, comprises:

correcting the motion vector for each of the two partitioned regions by using the different motion vector difference information.

10. The video encoding method of claim 8, wherein correcting the motion vector, when the two partitioned regions use same motion vector difference information, comprises:

correcting the motion vector for each of the two partitioned regions by using the same motion vector difference information.

11. The video encoding method of claim 9, wherein generating the prediction block of the current block comprises:

generating an inter-prediction block for each of the two partitioned regions by using a corrected motion vector; and generating the prediction block of the current block by combining or weighted averaging inter-prediction blocks for the two partitioned regions.

12. A method for transmitting a bitstream associated with video data, the method comprising:

generating the bitstream by encoding the video data; and transmitting the bitstream to a video decoding apparatus, wherein generating the bitstream comprises:

determining whether to apply a geometric partitioning mode;

determining a motion vector from a merge candidate list;

correcting the motion vector by using motion vector difference information; and generating a prediction block of a current block based on a corrected motion vector, wherein the motion vector difference information includes direction information and distance information, and wherein the direction information indicates one direction selected from a predetermined direction set, the predetermined direction set including four diagonal directions.

* * * * *